April 12, 1966  M. L. SMITLEY ETAL  3,245,281
AUXILIARY ENGINE GOVERNING SYSTEM
Filed April 30, 1962  3 Sheets-Sheet 1
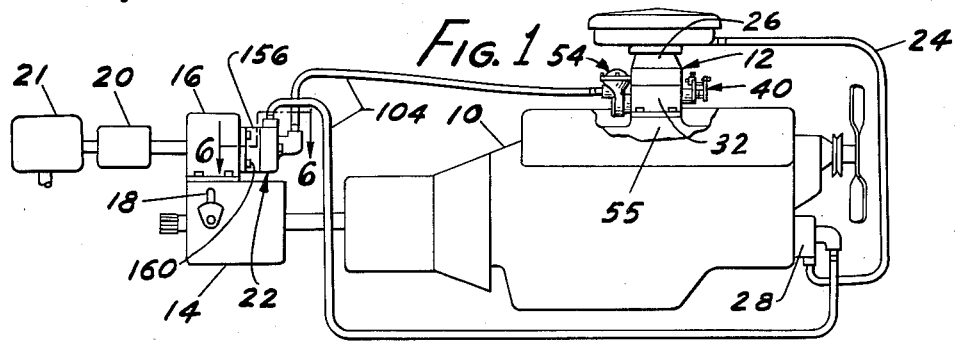
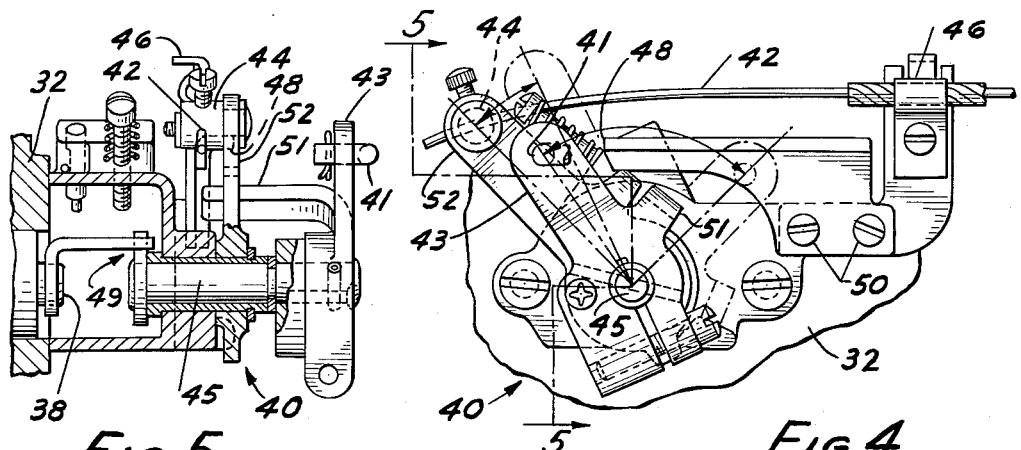
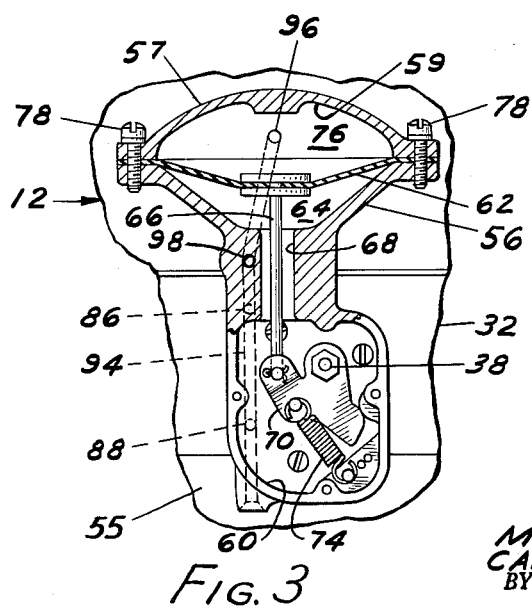
INVENTORS
MARION L. SMITLEY
CARLTON C. PHILLIPS
BY
Walter Patrobo, Jr.
ATTORNEY

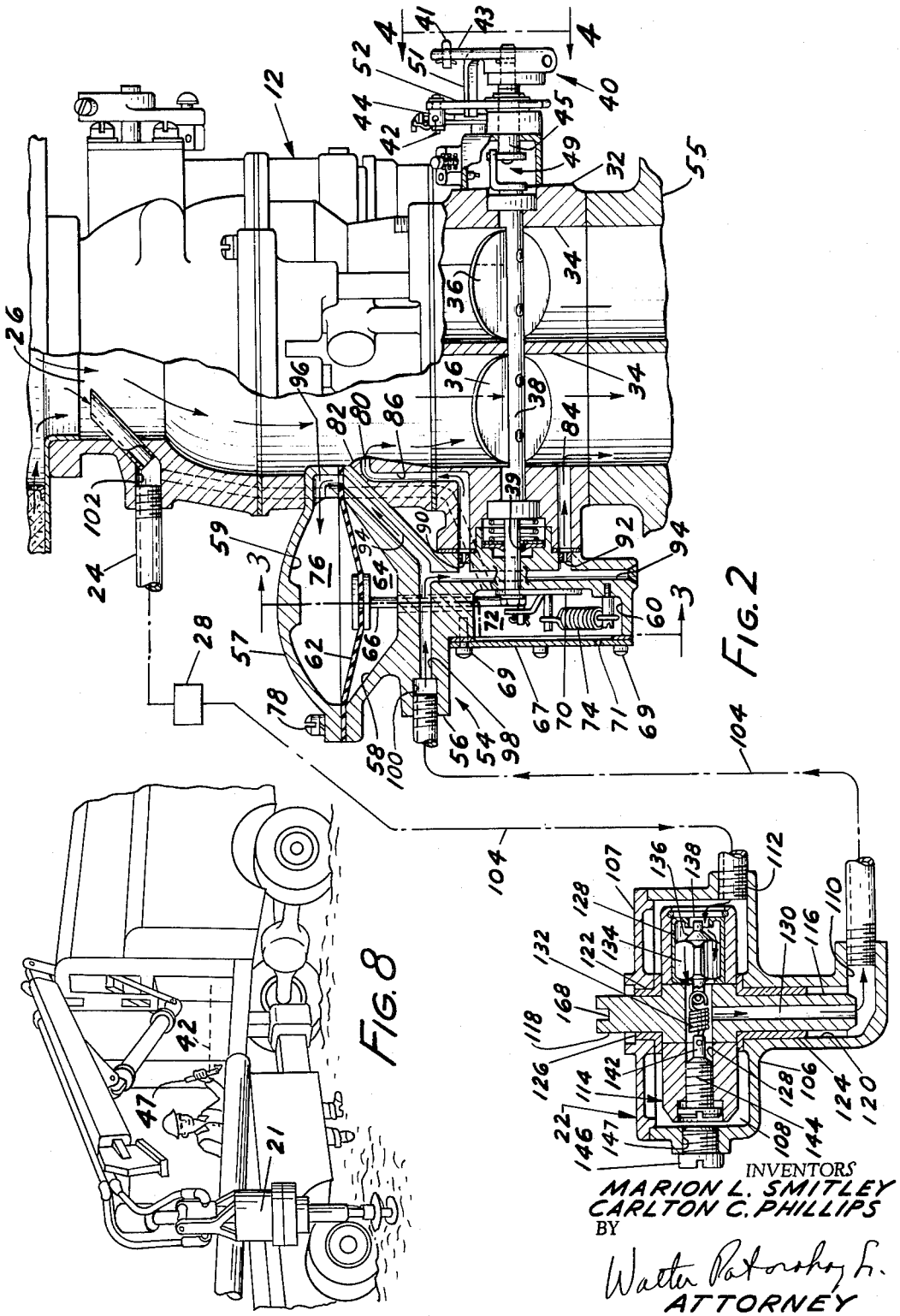
INVENTORS
MARION L. SMITLEY
CARLTON C. PHILLIPS
BY
*Walter Patorsky Jr.*
ATTORNEY April 12, 1966  M. L. SMITLEY ETAL  3,245,281
AUXILIARY ENGINE GOVERNING SYSTEM
Filed April 30, 1962  3 Sheets-Sheet 3

INVENTORS
MARION L. SMITLEY
CARLTON C. PHILLIPS
BY
Walter Patoroko, Sr.
ATTORNEY

United States Patent Office 3,245,281
Patented Apr. 12, 1966

3,245,281
AUXILIARY ENGINE GOVERNING SYSTEM
Marion L. Smitley, Huntington Woods, and Carlton C. Phillips, Birmingham, Mich., assignors to Holley Carburetor Company, Warren, Mich., a corporation of Michigan
Filed Apr. 30, 1962, Ser. No. 190,883
5 Claims. (Cl. 74—472)

This invention relates generally to vehicles driven by internal combustion engines and having a power take-off mechanism driven by the vehicle transmission, and more particularly to means for controlling the operation of the power take-off mechanism so as to protect the auxiliary equipment driven thereby.

Many truck fleets, such as those owned and operated by utility companies, include vehicles having a transmission-driven power take-off driving a hydraulic pump, the pump pressure being employed to drive some piece of auxiliary equipment such as an earth auger. In such cases, both the auxiliary equipment and the hydraulic pump may be damaged by overspeeding.

Since the auxiliary equipment is usually subjected to wide variations in load, the speed thereof will also vary, unless some means is provided for opening the throttle when the load increases and closing the throttle when the load decreases. Also, for most efficient operation of the auxiliary equipment, it is desirable to drive the power take-off, and thus the hydraulic pump, at a constant speed. From the standpoint of protection of the equipment, however, it is of great importance to prevent overspeeding when the load decreases.

In many cases, the engine is already provided with a governor to limit its maximum speed. However, in most cases where the engine also drives auxiliary equipmnet, the auxiliary equipment must be operated at some speed lower than the maximum speed of the engine, and probably even lower than the maximum governed speed of the engine.

A number of devices have been proposed to govern the maximum speed of a power take-off mechanism. However, these devices are either very complex and expensive or they require the use of cumbersome pulleys and belt drives. Others are simple manual devices, but attempting to manually maintain the required engine speed for each change in load on the auxiliary equipment is extremely difficult. Thus, no really commercially practical device to govern the maximum speed of a power take-off mechanism has been available, and the vehicle operator has had to pay too much attention to protecting the auxiliary equipment and not enough attention to the work he is attempting to perform. Another very serious objection to some present devices of this kind is that they employ cable drives between the power take-off unit and the speed sensing unit, in which case cable failure obviously results in the very overspeeding and equipment damage that is sought to be prevented.

Still other devices involve exposed moving parts, which is obviously undesirable. Also, rather extensive modifications have to be made to provide such devices on vehicles which were not originally thus equipped.

Accordingly, a general object of the invention is to provide means for governing the maximum speed of a power take-off unit driven by an engine transmission.

Another object of the invention is to provide such a device that is mounted directly on the power take-off shaft so as to eliminate the use of cable drives.

A still further object of the invention is to provide a self-aligning direct coupling means between the power take-off shaft and the speed sense of the governing means.

A still further object of the invention is to provide such a device that automatically adjusts the engine power so as to maintain a constant power take-off speed, regardless of variations of load to which the equipment driven by the power take-off is subjected.

Another object of the invention is to provide a device of this kind which is engine vacuum actuated and which does not require exposed moving parts and the use of cables, pulleys and belts which tend to fail, wear and get out of adjustment.

Still another object of the invention is to provide a device of this kind which can be used either alone or in combination with an engine governor.

A further object of the invention is to provide a device which is very compact in size and easy to install and which requires a minimum of maintenance.

These and other objects of the invention will become more apparent by reference to the following specification and the attached drawings, wherein:

FIGURE 1 is a schematic illustration of a vehicle engine driven auxiliary equipment system embodying the invention;

FIGURE 2 is a diagrammatic view, with portions thereof cut away and in cross-section, of certain elements of the invention shown by FIGURE 1;

FIGURE 3 is a cross-sectional view taken on the plane of line 3—3 of FIGURE 2 and looking in the direction of the arrows;

FIGURE 4 is an enlarged, fragmentary side elevational view of FIGURE 2 taken on the plane of line 4—4 of FIGURE 2 and looking in the direction of the arrows;

FIGURE 5 is a cross-sectional view taken on the plane of line 5—5 of FIGURE 4 and looking in the direction of the arrows;

FIGURE 8 is a perspective view of a typical truck-mounted, hydraulically-operated earth auger with which the invention may be employed;

Figure 6:
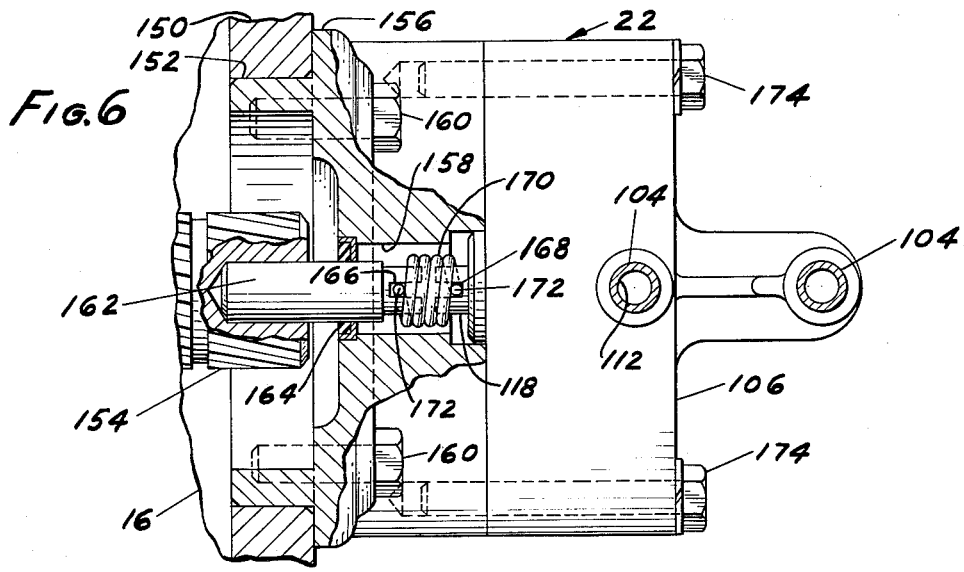
FIGURE 6 is an enlarged, fragmentary top plan view, with portions thereof cut away and in cross-section, taken on the plane of line 6—6 of FIGURE 1 and looking in the direction of the arrows.

Referring to the drawings in greater detail, FIGURE 1 illustrates schematically a governed auxiliary equipment system having as its source of power an internal combustion engine 10 which receives a combustible mixture of fuel and air from the carburetor 12 in the usual and well-known manner. The engine 10 drives a variable ratio transmission 14, which may be either the fluid coupling or the gear type. A power take-off unit 16 of any suitable design is connected to the transmission 14 so that it may be put into engagement with the output of the transmission 14 through any suitable control lever 18. Power take-off unit 16 can, in turn, have connected to it a hydraulic pump 20 driving some item of auxiliary equipment 21.

As will be seen from the more detailed description below, the invention involves the use of a vacuum type governor system such as that shown by Francis 3,018,766, wherein the manually controlled throttle valves of the carburetor are automatically closed for governing by a vacuum motor connected in a manner to replace the manual control when governing is desired. In this type of vacuum governor, a conduit communicates between a suitable source of vacuum, such as the intake manifold or the induction passage below the carburetor throttle valves, and the vacuum motor. A second conduit communicates between the vacuum motor or the first conduit mentioned above and atmosphere, this latter conduit being continuously open when governing is not desired so as to prevent vacuum from actuating the vacuum motor. The atmospheric conduit has connected therein a centrifugally unbalanced valve driven by the engine, in the case of an engine governor, so as to close the atmospheric conduit when engine speed approaches governed speed, thus allowing the manifold vacuum to actuate the vacuum motor and close the throttle valves.

In FIGURES 1 and 2, the centrifugally unbalanced valve driven by the engine for purposes of preventing overspeeding of the engine is represented by the reference numeral 28. The structure of this valve mechanism 28 may be the same as that of the valve assembly 92 shown by Francis 3,018,766. Since the detailed structure of this valve 28 forms no part of this invention, it need not be described herein, except by reference to the above mentioned Francis patent.

The invention contemplates the use of a second centrifugally unbalanced valve assembly 22 mounted directly on the power take-off mechanism so as to be driven by the power take-off shaft, thus eliminating the above mentioned flexible cable connections and other undesirable features of present power take-off control devices. Valve mechanism 22 may be used with or without the valve mechanism 28, its purpose also being to cut off the atmospheric bleed to the governor vacuum motor, but only when governed power take-off speed is reached.

Thus, when the power take-off unit 16 is in operation by reason of its being driven by the output of the transmission 14, the auxiliary centrifugal valve or speed sensing unit 22 will control the maximum engine speed as hereinafter described. When the power take-off 16 is not in operation, the valve 22 is open and acts as part of the atmospheric air bleed line 24 leading from the intake portion 26 of the carburetor 12, through an open engine speed sensing unit 28, if one is present, and back to the carburetor 12 or other source of operating vacuum.

FIGURE 2 illustrates a carburetor 12 comprising the usual air intake section 26 and throttle body section 32 having a pair of primary barrels 34, each barrel 34 having a throttle valve 36 mounted on a common shaft 38.

The vehicle operator's throttle foot pedal (not shown) is connected by link 41 to lever 43 of the throttle operating mechanism 40 in the well-known manner. Also, the usual hand throttle lever 52 used on utility vehicles embodying the invention will include means such as the Bowden wire 42 extending from the throttle lever swivel screw 44 through the sheath bracket 46 and to the hand throttle control 47, the latter being preferably located at a point near the operating position for the equipment 21 (see FIG. 8).

The carburetor 12 shown by FIGURE 2 is provided with a governor diaphragm assembly 54 constructed and secured to one side of the throttle body 32 in a manner so that the carburetor throttle valves 36 automatically close when the power take-off unit 16 reaches its governed speed. Alternatively, an auxiliary sandwich governor assembly including a diaphragm assembly 54 and separate throttle valves may be installed between the carburetor 12 and the engine intake manifold 55.

The governor diaphragm assembly 54 may comprise a body 56 and a cover 57, preferably castings, formed to provide recesses 58, 59 and 60. The use of flexible diaphragm 62, which is suitably secured between the body 56 and cover 57 by means of bolts 78, forms chambers 64 and 76, the latter chamber being sealed from the atmosphere. A cover plate 67, fastened to body 56 by means of screws 69, forms chamber 72 and includes a drilled hole 71 for venting chambers 72 and 64 to the atmosphere, thus preventing pressure variations below the diaphragm 62.

The diaphragm 62 has a rod 66 secured to the center thereof in a conventional manner. The rod 66 passes through a vertical bore or passage 68 connecting chambers 64 and 72, and it is pivotally connected at its other end to a lever 70 secured to the end of the primary throttle shaft 38 that extends into chamber 72. The shaft 38 has a suitable vacuum seal 39, and a tension spring 74 provides a force on lever 70 so as to bias the primary throttle plate 36 to the open position.

The manual throttle operating mechanism 40, which includes the lever 43 connected through link 41 to the vehicle operator's throttle foot pedal (not shown) and the hand throttle lever 52 actuated by wire 42, is well known in the art and need not be described in detail. In general, mechanism 40 cooperates with the spring 74 through the throttle shaft 38 in a manner to permit spring 74 to move the throttle valves 36 to the open position when the operator's foot pedal is depressed, or the hand throttle is pulled out, and to positively close the throttle valves 36 against the force of spring 74 when the foot pedal or hand throttle is returned. From FIGURES 2, 4 and 5, it is apparent that lever 43 is fixed to a stub shaft 45 which connects with throttle shaft 38 through a dog arrangement 49. Lever 52 is free on the stub shaft 45, but it cooperates with lever 43 when the hand throttle control 47, rather than the foot throttle pedal, is operated; that is, lever 52 moves lever 43 in the throttle opening direction, and it limits the return of lever 43 by the usual foot pedal spring, which has a greater force than spring 74, in the throttle closing direction. This is accomplished by the portion 51 of the lever 43 extending across the path of travel of lever 52.

The details of construction of the foot pedal and hand throttle means and the other portions of the carburetor 12 not described in detail are not important to the invention and may be of any desired construction well known in the art, it being sufficient to state that the throttle valves 36 may be closed against the force of spring 74 by operation of the diaphragm 62, regardless of positions of the foot pedal or the hand throttle, which cooperate but control the throttles independently.

It is desirable, for proper functioning of certain engines during the operation of auxiliary equipment 21, that a stop 48 be employed, as shown in FIGURE 4, for the hand throttle lever 52. The stop 48 may be fastened to the hand throttle wire bracket 46 by the wire bracket screws 50 so as to limit the movement of the hand throttle lever 52 in the throttle opening direction by manual operation of the auxiliary equipment hand throttle control 47. Hence, when the power take-off governor valve assembly 22 is in operation and the hand throttle lever 52 is positioned against the throttle lever stop 48, there is established a resultant maximum opening of throttle plate 36 which is less than the usual wide open throttle plate setting obtained during normal vehicle engine operation by use of the foot pedal. The maximum opening thus obtained is an essential part of the calibration of the auxiliary governor system in many instances, and particularly at low speed requirements, in order to eliminate certain undesirable characteristics that would otherwise result. This will be described more thoroughly in a later discussion relative to the governor power curve of FIGURE 7. An alternate means of limiting the maximum throttle plate 36 opening would be to strategically locate a clamping device (not shown) on the Bowden wire 42 at a point where it would come into contact with some fixed member on the carburetor or the vehicle.

An orifice 80 at the primary venturi 82 and an orifice 84 below the primary throttle plate 36 are connected by means of the passages 86 and 88 having fixed restrictions 90 and 92, respectively, with a vertical passage 94 in the body member 56, as well as with a passage 96 in the cover member 57 which leads to the chamber 76. A further passage 98 connects passage 94 with an air bleed port 100.

Air bleed port 100 in the body 56 and the air inlet port 102 in the air intake portion 26 of the carburetor 12 are connected by conduits 104 and 24 and adapted to continuously bleed some quantity of air, preferably clean air from the intake portion 26 of the carburetor 12, to the chamber 76, the venturi 82 and/or the primary barrels 34 below the throttle valves 36 through the above identified passages provided in the carburetor 12 and the body 56 so long as the engine 10 is running and the speed of the power take-off unit 16 remains below its governed speed.

As already stated above, centrifugal valve assembly 22 is connected in the conduit 104, its function being to progressively reduce or to completely shut off the flow of bleed air through the conduit 104 and to thus apply an increasingly reduced pressure or vacuum in the chamber 76. It is apparent that such a vacuum in the chamber 76, the intensity of which will depend upon the amount of air bled through the valve assembly 22, will result in an upward movement of the diaphragm 62 and the consequent closing of the throttle valves 36 in accordance with the intensity of the vacuum. It is to be understood that the vacuum at the venturi 82 and/or the barrel 34 is always sufficient to actuate the diaphragm 62.

The centrifugal valve assembly 22 may comprise an outer housing 106, including a cover member 107, forming an annular chamber 108 and having ports 110 and 112 extending from the chamber 108 and through the housing 106. A rotating centrifugal valve assembly 114 is positioned within the annular chamber 108 by means of journal members 116 and 118 received in the axially extending bores 120 and 122, respectively. Bearing members 124 and 126 may be provided for the journal members 116 and 118, with bearing 126 also providing a vacuum seal.

The valve assembly 114 may be formed with a passage 128 communicating with a passage 130 extending through the journal member 116 to provide a continuous air conduit together with or forming a part of the conduit 104. The passage 128 contains a suitable tension spring 132 having connected at one end thereof a valve member 134 adapted through the tapered portion 136 to reduce the area of or to completely close off the orifice 138. The other end of the spring 132 is secured to an anchor 142, the axial position of which may be adjusted by means of the screw 144, access to the screw 144 being provided by removing the screw 146 threaded in the opening 147. Journal 118 is adapted to be connected, in the manner described below, to be driven in accordance with the speed of the power take-off unit 16.

With the above described structure, it will be apparent that as the valve assembly 114 increases in rotational velocity, the valve member 134 will be forced outwardly against the tension of the spring 132 to an extent dependent upon the position of the anchor 142, the rate of the spring 132 and the rotational velocity of the member 134, and that the orifice 138 will ultimately be decreased in area or completely shut off.

Assume now that governor valve assembly 22, connected to the power take-off 16 for rotation of assembly 114 in accordance with the speed of the power take-off unit 16, and hence with the speed of the pump 20 and the auxiliary equipment 21, is brought into operation by virtue of manual engagement of the power take-off control lever 18. It is irrelevant whether or not the vehicle includes an engine speed governor valve assembly 28, the construction of which could be substantially the same as that of assembly 22, except that it would be driven by the engine 10. If an assembly 28 is present, it will always have been calibrated at a much higher predetermined governing speed than the auxiliary governing valve 22; thus, the latter valve alone will control the speed of the engine 10 while auxiliary equipment 21 is being operated.

Calibration of assembly 22 is accomplished by adjustment of the anchor 142 to which the spring 132 is attached to establish the predetermined governing speed. It is apparent, therefore, that so long as the speed of the power take-off unit 16 is below governed speed, vacuum at the venturi 82 or in the primary barrel 34 below the throttle valve 36 will cause air from the intake section 26 of the carburetor 12 to continuously flow through the conduits 104 and 24 and either through the valve assembly 22 alone, or through both valve assemblies 22 and 28 where an engine speed unit is also incorporated in the system. Thus, the pressure in chamber 76 will be essentially atmospheric, and the diaphragm 62 will have no effect on the position of the throttle valves 36.

As soon as the power take-off unit speed increases so as to approach governed speed, the orifice 138 will begin to be reduced in effective area by the tapered valve end 136, resulting in a decrease in the flow of air through the conduit 104 and a consequent progressive build-up of reduced pressure or vacuum in the chamber 76. This results in a progressive lifting of the diaphragm 62 and closing of the throttle valves 36, the closing of the throttle valves being independent of the particular position of the hand throttle control 52.

Figure 7:
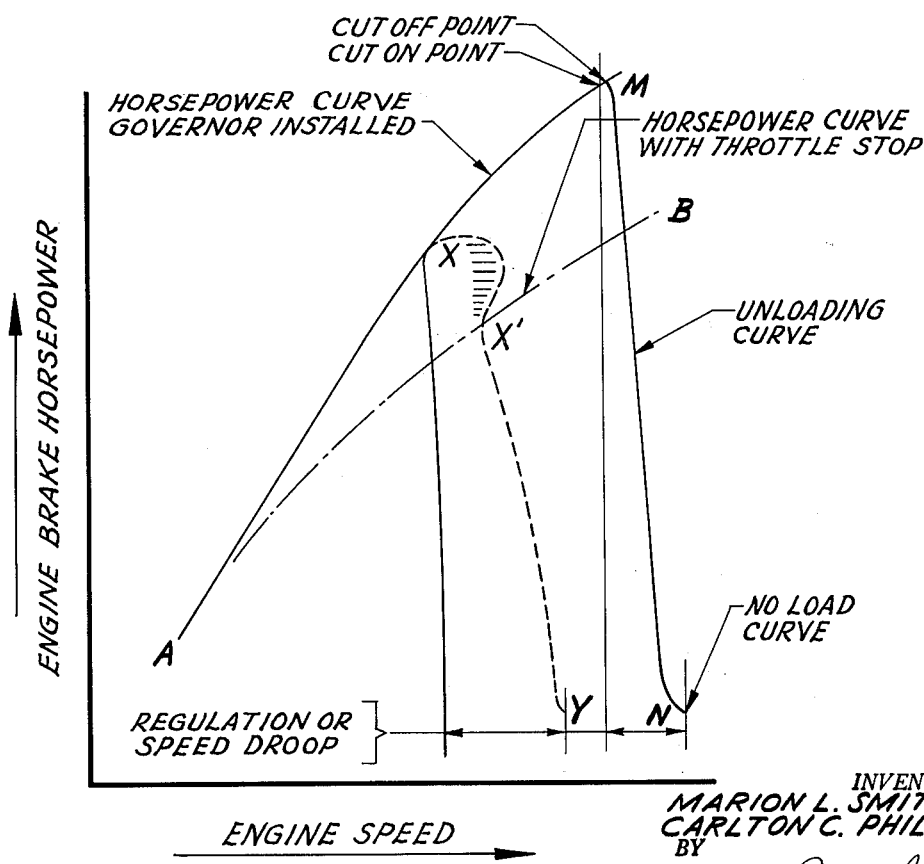
FIGURE 7 is a qualitative governor power curve that would be obtained by the use of the invention.

In other words, as the governed power take-off speed is reached, the orifice 138 will be closed sufficiently so that the vacuum necessary to govern is applied to the diaphragm 62 and the throttle valves 36 are positioned so as to produce the governor power curve shown by FIGURE 7.

Where there is governor valve assembly 28 connected for rotation with the engine 10, it would control the engine speed as indicated by the solid line unloading curve MN of FIGURE 7. Governor valve assembly 22, being connected for rotation with the power take-off 16, and hence with pump 20, will control the engine speed as indicated by the dotted line curve XY in those instances where a throttle stop 48 is not employed. Curve XY would be applicable to some particular gear ratio which would be preselected for the most efficient power range for the pump 20.

If the speed sensing unit 22 should be used in conjunction with an automatic fluid transmission engine, it will not control a given constant engine speed as indicated by curve XY of FIGURE 7; rather, it will control some variable engine speed, dependent upon any slippage of the transmission, in order to maintain a constant speed of the power take-off unit 16.

Where the throttle stop 48 is used to limit the maximum opening of the throttle plates 36 with the use of the hand throttle, the horsepower curve would be as per the dot-dash line AB of FIGURE 7, and the auxiliary valve assembly 22 would thereupon control the engine speed as indicated by the shorter dotted line curve X'Y. While this has the effect of cutting down on the maximum power available, the operation of the auxiliary equipment 21 is such that the power represented by XX' is not required and, in most instances if allowed to be present, would have a detrimental effect as represented by the shaded nose area between X and X'. This would result from the low engine vacuum in this portion of the curve and would vary in magnitude from one engine model to another. Also, without the throttle stop 48, the XY curve would be slightly steeper, approaching the slope of unloading curve MN, and power surges, bothersome to the auxiliary equipment operator, would result.

FIGURE 6 illustrates the preferred manner in which the governor valve assembly 22 is connected to the power take-off unit 16, this connection being such that it can be easily made, either as an original equipment installation or as a subsequent adaption. The power take-off unit housing 150 may be originally or subsequently formed with an opening 152 so as to provide access to the power take-off shaft 154. An adapter member 156 having an axial opening 158 formed therein is secured to the power take-off housing by any suitable means such as the bolts 160. The power take-off shaft 154 is drilled to receive the coupling member 162 which may be press-fit into the shaft. A suitable seal 164 may be provided in the adapter member 156, and the free end of the coupling member 162 is formed with a slot 166 similar to the slot 168 formed in the protruding end of the valve journal 118. The coupling member 162 and the journal 118 are then connected by means of a suitable coil spring coupling member 170 having diametrically extending end portions 172 received in the slots 166 and 168. The governor valve member 22 is then bolted to the adapter member 156 by bolts 174.

With the above construction, the coil spring coupling member 170 provides a resilient connection that compensates for any axial misalignment between the coupling member 162 and the journal 118. The direct connection of the governor valve assembly 22 to the power take-off unit 16 provides a compact assembly that is protected from an accumulation of dirt and eliminates exposed moving parts and cable drives. The latter is particularly important inasmuch as cable failures, which can and do occur, result in overspeeding of and damage to the pump 20 and the equipment 21. The compact enclosed construction also prevents any tampering with the mechanism.

Thus, it can be seen that the many disadvantages inherent in previous auxiliary equipment governor mechanisms, such as the possibility of hydraulic pump damage and the necessity of constant supervision and hand throttle adjustment during alternating varying load conditions, are very effectively eliminated by the proposed automatic power control system.

In certain vehicles, one end of the power take-off may drive the auxiliary equipment, while the other end drives the front wheels of the vehicle. In that event, the centrifugal valve assembly 22 may be similarly mounted directly on the pump 20 or other auxiliary mechanism, rather than on the power take-off 16.

Although but one embodiment of the invention has been disclosed and described, it is apparent that other modifications are possible within the scope of the appended claims.

What we claim as our invention is:

1. A substantially constant speed governor for a vehicle driven by an internal combustion engine having a throttle valve for controlling the flow of fuel to said engine, said vehicle having a power take-off mechanism driven by the engine transmission, said governor comprising a vacuum motor connected to said throttle valve, air bleed means for rendering said vacuum motor inoperative, and an adjustable centrifugal valve connected in series in said air bleed means and adapted for rotation in accordance with power take-off speed to variably restrict said air bleed and control the air supply therethrough, said variable air supply serving to actuate said vacuum motor, said power take-off mechanism including a casing and a power take-off shaft having the free end disposed near a wall of said casing, an access opening in said casing adjacent said end of said shaft, said centrifugal valve being secured to said casing and having a shaft adapted to be driven by said power take-off shaft, the connection between said power take-off shaft and said centrifugal valve shaft including an adapter secured to said power take-off shaft, said free end of said adapter and the free end of said centrifugal valve shaft each having a slot formed therein, and a resilient coupling having end portions fitting into said slots, said power take-off and centrifugal valve elements being secured in a manner so as to present no exposed moving parts, and said resilient coupling compensating for any misalignment between said shafts.

2. A governor system for a vehicle driven by an internal combustion engine having a throttle valve for controlling the flow of combustionable mixture to said engine, said vehicle having a power take-off mechanism driven by the engine transmission, said governor system comprising a vacuum motor connected to said throttle valve, air bleed means for rendering said vacuum motor inoperative, and a pair of adjustable centrifugal valves connected in series in said air bleed means and adapted for rotation in accordance with engine and power take-off speeds respectively to variably restrict said air bleed and control the air supply therethrough, said variable air supply serving to actuate said vacuum motor, said series connection resulting in governing action normally responsive to one or the other of said speeds and not to both of said speeds, said power take-off mechanism including a casing and a power take-off shaft having the free end disposed near a wall of said casing, an access opening in said casing adjacent said end of said shaft, a spacer member secured to said casing and having a passage therethrough co-axial with said shaft, one of said centrifugal valves being secured to said spacer member and having a shaft adapted to be driven by said power take-off shaft, the connection between said power take-off shaft and said centrifugal valve shaft including an adapter secured to said power take-off shaft, said free end of said adapter and the free end of said centrifugal valve shaft each having a slot formed therein, and a coil spring coupling having diametric end portions fitting into said slots, said power take-off and centrifugal valve elements being secured in a manner so as to present no exposed moving parts, said coil spring coupling compensating for any misalignment between said shafts.

3. A governor system for a vehicle driven by an internal combustion engine having a throttle valve for controlling the flow of combustionable mixture to said engine, said vehicle having a power take-off mechanism driven by the engine transmission, said governor system comprising a vacuum motor connected to said throttle valve, air bleed means for rendering said vacuum motor inoperative, and a pair of adjustable centrifugal valves connected in series in said air bleed means and adapted for rotation in accordance with engine and power take-off speeds respectively to variably restrict said air bleed and control the air supply therethrough, said variable air supply serving to actuate said vacuum motor, said series connection resulting in governing action normally responsive to one or the other of said speeds and not to both of said speeds, said power take-off mechanism including a casing and a power take-off shaft having the free end disposed near a wall of said casing, an access opening in said casing adjacent said end of said shaft, one of said centrifugal valves being secured to said casing and having a shaft adapted to be driven by said power take-off shaft, the connection between said power take-off shaft and said centrifugal valve shaft including an adapter secured to said power take-off shaft, said free end of said adapter and the free end of said centrifugal valve shaft each having a slot formed therein, and a coil spring coupling having diametric end portions fitting into said slots, said power take-off and centrifugal valve elements being secured in a manner so as to present no exposed moving parts, said coil spring coupling compensating for any misalignment between said shafts.

4. A combined engine and engine driven auxiliary equipment governor for an engine driven vehicle having a carburetor with a throttle valve therein, said governor comprising separate throttle actuating means for controlling the fuel flow past said throttle valve, a stop member for limiting the throttle opening by said actuating means for operating said equipment, said means being actuated by vacuum, a conduit between said vacuum actuated means and an air source for continuously bleeding air to said means so long as governed engine or equipment speed has not been approached, and a pair of centrifugal valves connected in said conduit, one of said valves being connected for rotation in accordance with engine speed and the other of said valves being connected for rotation in accordance with equipment speed, said valves being independently adapted to progressively vary said vacuum as the speed of the engine or the equipment respectively approaches governed speed.

5. A substantially constant speed governor for a vehicle driven by an internal combustion engine having a throttle valve for controlling the flow of fuel to said engine, said vehicle having a power take-off mechanism driven by the engine transmission, and auxiliary equipment driven by said power take-off, said governor comprising a vacuum motor connected to said throttle valve, air bleed means for rendering said vacuum motor inoperative, and an adjustable centrifugal valve connected in said air bleed means and adapted for rotation in accordance with auxiliary equipment speed to variably restrict said air bleed and control the air supply therethrough, said variable air supply serving to actuate said vacuum motor, said auxiliary equipment including a casing and a power shaft having the free end disposed near a wall of said casing, an access opening in said casing adjacent said end of said shaft, a spacer member secured to said casing and having a passage therethrough co-axial with said shaft, said centrifugal valve being secured to said spacer member and having a shaft adapted to be driven by said power shaft, the connection between said power shaft and said centrifugal valve shaft including an adapter secured to said power shaft, said free end of said adapter and the free end of said centrifugal valve shaft each having a slot formed therein, and a coil spring coupling having diametric end portions fitting into said slots, said auxiliary equipment and centrifugal valve elements being secured in a manner so as to present no exposed moving parts, and said coil spring coupling compensating for any misalignment between said shafts.

References Cited by the Examiner

UNITED STATES PATENTS

| | | | |
|---|---|---|---|
| 1,957,307 | 5/1934 | Von Ohlsen | 64—15 X |
| 2,213,196 | 9/1940 | Bartholomew | 180—53 |
| 2,294,386 | 9/1942 | Curtis et al. | 64—15 |
| 2,472,450 | 6/1949 | Van Vleck | 180—53 |
| 2,657,918 | 11/1953 | Parker | 123—97 |
| 2,708,979 | 5/1955 | Reynoldson | 123—103 X |
| 2,727,501 | 12/1955 | Worth | 123—97 X |
| 2,818,747 | 1/1958 | Rich | 74—482 |
| 3,018,766 | 1/1962 | Francis | 123—103 |
| 3,040,596 | 6/1962 | Du Shane et al. | 74—482 |

DON A. WAITE, *Primary Examiner.*

R. D. GRAUER, H. S. LAYTON, *Assistant Examiners.*